S. B. REEDER.
Corn Planter.
No. 82,875.
Patented Oct. 6, 1868.
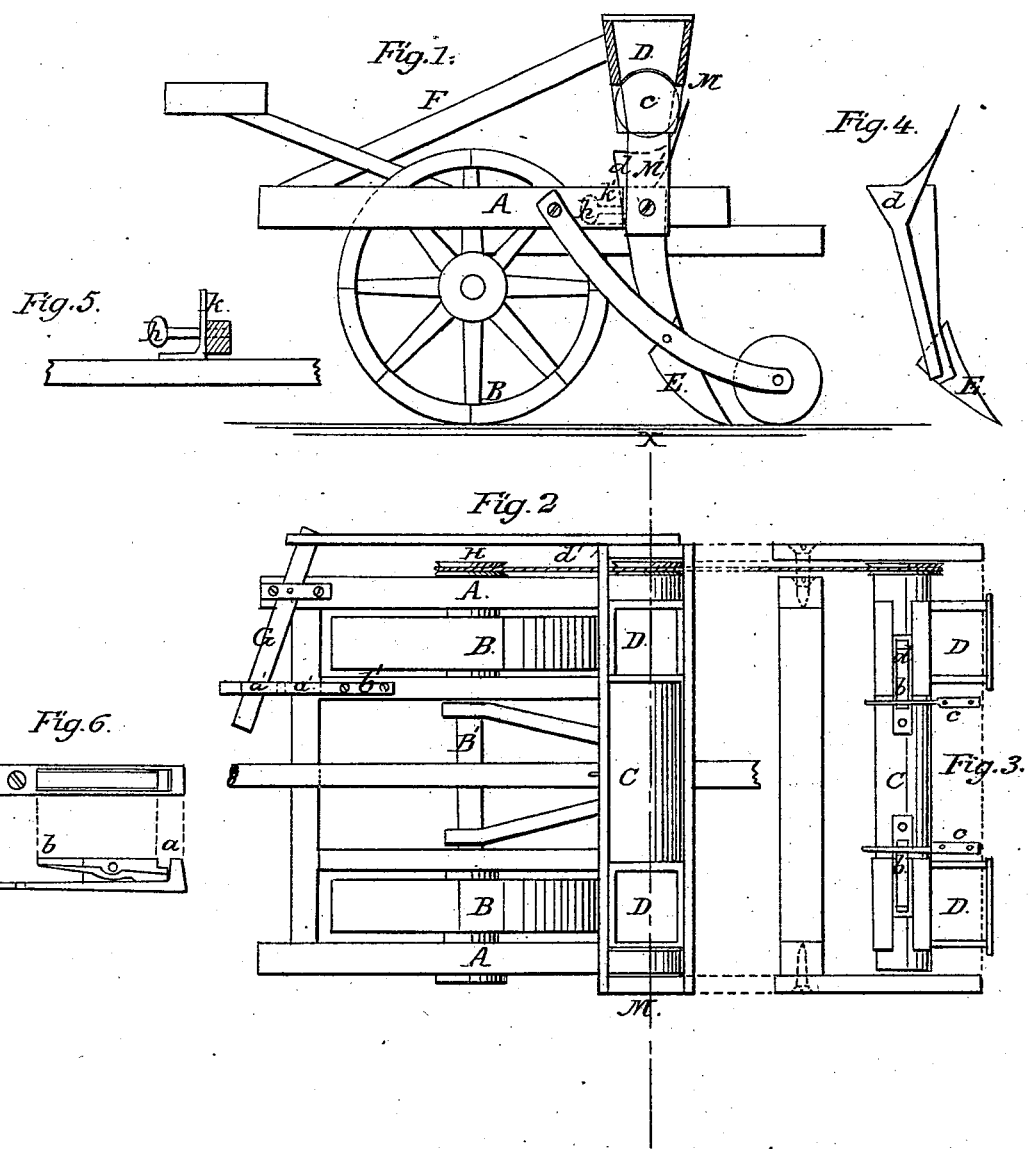
WITNESSES:
Edwin James
John D. Bloor.
INVENTOR:
Simon B. Reeder
by Holmead & Hollingshead
Attorneys

United States Patent Office.

SIMON B. REEDER, OF MEACHAM, ILLINOIS.

*Letters Patent No. 82,875, dated October 6, 1868.*

IMPROVEMENT IN CORN-PLANTER.

*The Schedule referred to in these Letters Patent and making part of the same.*

TO ALL WHOM IT MAY CONCERN:

Be it known that I, SIMON B. REEDER, of Meacham precinct, county of Marion, and State of Illinois, have invented certain new and useful Improvements in Corn-Planters, which I style "The Eureka Corn-Planter;" and I do hereby declare that the following is a full, clear, and exact description of the same, reference being had to the accompanying drawing, and the letters of reference marked thereon, making part of this specification, in which—

Figure 1 is a side view.
Figure 2 is a plan view.
Figure 3 is a plan view of the dropping-roller.
Figure 4 is a side view of the plowshare, funnel, and tube through which the corn passes from the dropping-box in the roller.
Figure 5 is a side view of the screw and plate by which the plowshares are raised from the ground.
Figure 6 is a plan view of the dropping-box and spring-lever.

The nature of my invention consists in balancing the mechanism of the corn-planter on two wheels, and in hinging upon the front part of the machine a framework, supported by two uprights, in which I place a roller containing two or more boxes, with spring-levers attached, to drop the corn, and two hoppers to contain the same. These two hoppers are placed immediately over the boxes in the roller, and are opened at the bottom to let the corn through. Both the hoppers and the boxes are immediately over a funnel, the small end of which is elongated, and reaches nearly to the ground close behind the plowshare.

On the rear end of the tongue, and immediately in rear of the front beam of the main framework of the machine, I attach a right-angled plate, the lower side being securely fastened to the face of the tongue, and the other side of the angle being provided with the threads of a female screw, in which works a screw, by means of which the front part of the machine is raised from the ground when the plows are not required for use.

To the framework in which the hoppers are placed, I attach two cam-catchers immediately over the ends of the spring-levers of the dropping-boxes, and so arranged that when the roller has sufficiently revolved to bring these boxes immediately over the mouth of the funnel, the cam-catchers will press upon the spring-levers, and cause the boxes to open and pass the corn to the funnel beneath.

The roller is geared to a wheel fastened to the outside of the main axle-tree of the machine. This gearing is unloosened by means of a lever, one end of which is fastened to the framework containing the roller and hoppers, and the other end to a lever working on the main framework of the machine on the left of the driver's seat. By means of these levers the whole roller and hopper-framework, being hinged to the main framework of the machine, is thrown into such a position as to enable the gearing to be released, and the roller to cease revolving.

To enable others skilled in the art to make and use my invention, I will now proceed to describe its construction and operation.

A is the main framework of the machine. B B are the wheels. C is the dropping-roller. D D are the hoppers. E is the plowshare; F, the lever for throwing the roller and hopper-framework in a position to release the gearing. G is the lever which is attached to and acts upon the lever F. The free end of this lever is held in position by means of slots, $a'$ $a'$, in the opening $b'$. H is the wheel, fastened upon the main axle-tree B', on the outside of the wheel, and on which gears the rope or chain, $d'$, which moves the dropping-roller. M is the framework, which contains the dropping-roller and hoppers. M' are the uprights, supporting the same. $a$ $a$ are the boxes, which are opened or closed by means of the spring-lever $b$. $c$ $c$ are the cam-catchers, which press upon the spring-levers $b$ $b$ when the dropping-roller has made sufficient revolution to bring the opening of the dropping-boxes over the mouth of the funnel. $d$ is the mouth of the funnel, having an elongated end through which the corn passes to the ground. $h$ is the screw, which works into the right-angled plate $k$, by means of which the plows are raised from the ground when not required for use.

The operation is as follows: The roller and hopper-framework is thrown in position to fasten the gearing by means of the levers F and G, after which it is returned to its proper position. The corn is then placed in the hopper D, and, with each revolution of the main wheels, two or more revolutions of the dropping-roller are made. As soon as the grain is received in the box $a$, and after the roller has made sufficient revolution to bring the opening of the box $a$ over the mouth of the funnel $d$, the cam-catcher $c$ strikes the spring-lever $b$, and the corn is dropped into the funnel, from whence it passes to the ground.

Having thus fully described my invention, what I claim as new, and desire to secure by Letters Patent of the United States, is—

A corn-planter, when the same is provided with a roller, C, having in it two or more dropping-boxes, $a$, with springs $b$ attached, which springs are operated upon by a cam-catch, $c$, substantially as described, and for the purpose specified.

In testimony whereof, I have signed my name to this specification in the presence of two subscribing witnesses.

S. B. REEDER.

Witnesses:
   W. J. BOUSMAN,
   THOMAS M. WILLIAMS.